United States Patent [19]

Weintraub et al.

[11] 4,298,901

[45] Nov. 3, 1981

[54] RESISTIVE CONTROLLER

[76] Inventors: Marvin H. Weintraub, 5743 Kingsfield Dr., West Bloomfield, Mich. 48033; Fred Oblinger, 31610 Delaware, Livonia, Mich. 48150

[21] Appl. No.: 34,609

[22] Filed: Apr. 30, 1979

[51] Int. Cl.³ .......................................... H01H 47/32
[52] U.S. Cl. .................................. 361/178; 361/198; 239/DIG. 15
[58] Field of Search ............. 361/178, 198; 324/30 R, 324/65 R; 239/DIG. 15

[56] References Cited

U.S. PATENT DOCUMENTS

| | | | |
|---|---|---|---|
| 2,578,981 | 12/1951 | Parker | 299/27 |
| 2,611,643 | 9/1952 | Higgins | 299/25 |
| 2,695,976 | 11/1954 | Hasenkamp | 315/76 |
| 2,721,101 | 10/1955 | Richard, Jr. | 239/DIG. 15 |
| 2,737,615 | 3/1956 | Roby et al. | 361/178 |
| 2,943,245 | 6/1960 | Ohlheiser | 239/DIG. 15 |
| 3,195,816 | 7/1965 | Mercer | 239/63 |
| 3,197,699 | 7/1965 | Johansen | 361/178 |
| 3,224,676 | 12/1965 | Rauchwerger | 361/178 |
| 3,590,335 | 6/1971 | Tetar | 361/178 X |

FOREIGN PATENT DOCUMENTS 853284 11/1960 United Kingdom ............ 361/178

*Primary Examiner*—J. D. Miller
*Assistant Examiner*—L. C. Schroeder
*Attorney, Agent, or Firm*—Basile, Weintraub & Hanlon

[57] ABSTRACT

A resistive controller suitable for sensing a variable electrical resistance indicative of a characteristic of a substance and for connecting an external electrical device to a source of electrical power when the measured electrical resistance reaches a predetermined level. The resistive controller includes a timer circuit which is activated when the measured electrical resistance reaches the predetermined value and which, in one embodiment, provides an adjustable time period, upon the expiration of which, the external electrical device is disconnected from the source of electrical power. In another embodiment, the timer circuit provides an adjustable time period, upon the expiration of which, the external electrical device is connected to the source of electrical power.

14 Claims, 3 Drawing Figures

RESISTIVE CONTROLLER

BACKGROUND OF THE INVENTION

I. Field of the Invention

This invention relates, in general, to electrical control circuits and, more specifically, to resistive controllers which measure the electrical resistance of a substance and, if the measured resistance falls within a certain predetermined range, actuate an external device.

II. Description of the Prior Art

Resistive controllers are known for measuring the electrical resistance of a substance and, when the electrical resistance falls within a predetermined range, for actuating an electrical device. Such resistive controllers have typically been used in automatic sprinkler systems for lawns and farms. In such an application, probes are embedded in the soil to measure the resistance, which is indicative of the moisture content of the soil. When the resistance increases past a predetermined value, the resistive controller activates a relay which connects power to an external electrical device, such as a solenoid-operated valve, to turn on water flow to the soil.

Although the prior art resistive controllers function acceptably in sprinkler control systems, they cannot be adapted for use in other applications requiring the addition of other substances to liquid streams, such as the addition of chlorine to swimming pools or the adjustment of the ph levels of a liquid. The resistive controllers disclosed in the prior art are activated by increasing resistance in the substance being monitored and, therefore, cannot be utilized in those applications which require activation when the measured resistance decreases or falls below a predetermined minimum value. Furthermore, in those applications requiring the addition of a second substance, other than water, to a first substance being monitored, an alarm and immediate shut down of the system is required if the levels of both substances are not balanced within a predetermined range within a selected period of the time. This situation occurs when there are insufficient quantities of second susbstance necessary to balance the constituent levels of the system or a defect has occurred in the application apparatus. None of the resistive controllers utilized in the prior art disclose any means of providing an alarm and immediate shut down of the system if the levels of the substances involved are not within prescribed limits within a selected period of time after the addition of the second substance to the first has been initiated.

Furthermore, the prior art resistive controllers are actuated immediately when the measured resistance reaches a predetermined level. This feature leads to rapid on and off operation as well as the possibility of a false activation as the measured resistance approaches the predetermined resistance level.

Thus, it would be desirable to provide a resistive controller which measures a variable electrical resistance of a substance and, when the measured resistance reaches a predetermined level, which actuates an electrical device to initiate the addition of a second substance to the substance being monitored. It would also be desirable to provide a resistive controller which automatically de-energizes the electrical device if the measured electrical resistance of the substance being monitored is not within prescribed limits within a selected period of time after the addition of the second substance to the first has been initiated. It would also be desirable to provide a resistive controller which is responsive to either increasing and decreasing levels of electrical resistance for actuating an electrical device. Finally, it would be desirable to provide a resistive controller which does not oscillate between on and off states after actuation.

SUMMARY OF THE INVENTION

Herein disclosed in a new and improved resistive controller suitable for sensing a variable electrical resistance indicative of a characteristic of a substance and for connecting an external electrical device to a source of electrical power when the measured electrical resistance reaches a predetermined level.

The resistive controller includes a pair of resistive sensors, one end of each being disposed in spaced-apart relation in the substance to be monitored. The other ends of the sensors are connected in series with a variable electrical resistance between a source of electrical power and ground. Electrical switching means, comprising a transistor is connected to the mid-point between the sensor and variable electrical resistance means and is switched to a conductive state when the resistance sensed by the sensors receives a predetermined value. The electrical switching means, in turn, actuates an electrical relay whose associated contact connects an external electrical device to the source of electrical power. The resistive controller further includes a timer circuit which, in one embodiment, is activated by the energization of the relay and which provides an adjustable time period, upon the expiration of which, the electrical device is disconnected from the electrical power source. In another embodiment, the timer circuit provides a predetermined amount of time after the measured resistance reaches the predetermined level before connecting the electrical device to the power source.

The novel resistive controller of this invention provides several advantages over prior art resistive controllers which have been predominently utilized in automatic sprinkler control systems. Such prior art resistive controllers are activated upon an increase in measured resistance, which is indicative of decreasing moisture content in the soil. The resistive controller of this invention, on the other hand, can be easily adapted to be activated for either increasing or decreasing resistance level applications, thereby affording added versatility over similar prior art devices.

In addition, the resistive controller of this invention uniquely provides a timer circuit which, in one embodiment, is operative to disconnect the external electrical device from the electrical power source if, after the expiration of a preselected time period, the electrical resistance measured by the sensor has not returned to acceptable levels. In this manner, the external electrical device is turned off in those situations where the apparatus adding the second substance to the first has insufficient quantities of the second substance or is defective. In the other embodiment wherein the electrical device is connected to the power source a predetermined amount of time after the measured resistance reaches the preset level, the use of the timer circuit insures that the resistive controller is actuated only upon receiving a positive start signal and further the timer delay provided by the timer circuit prevents the resistive controller from rapidly oscillating between on and off states after actuation.

DESCRIPTION OF THE DRAWINGS

The various features, advantages and other uses of this invention will become more apparent upon referring to the following detailed description and drawing in which.

DESCRIPTION OF THE PREFERRED EMBODIMENTS

Figure 1:
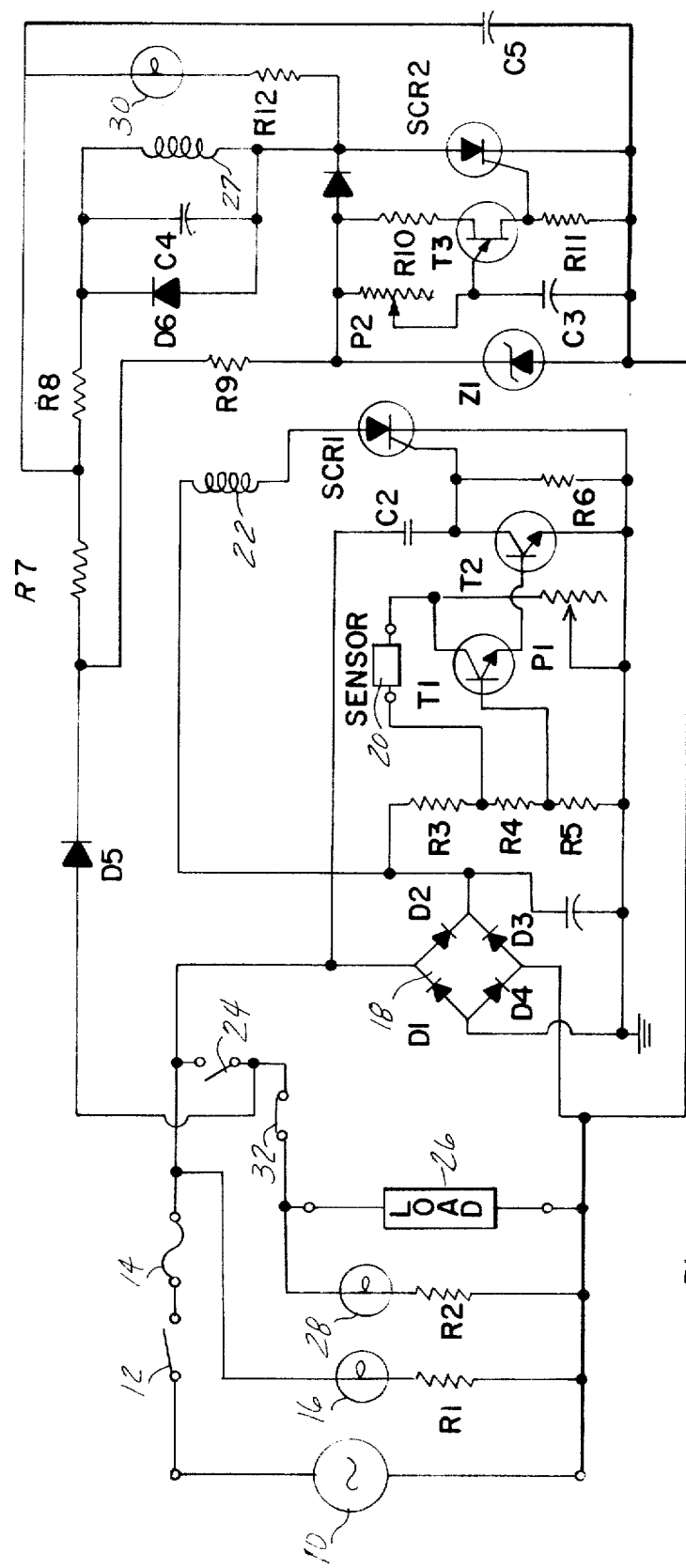
FIG. 1 is a schematic diagram of a resistive controller constructed according to the teachings of this invention.

Throughout the following description, identical reference numbers are used to refer to the same component shown in multiple figures of the drawing.

This invention discloses a resistive controller which senses a variable electrical resistance indicative of a characteristic of a substance and which actuates an electrical device when the measured electrical resistance reaches a predetermined value. The resistive controller of this invention is ideally suited for use in a sprinkler/irrigation control system wherein the resistive controller functions to maintain the moisture content of the soil at a predetermined level, or in swimming pools to maintain a desired level of chlorine in the water or for monitoring ph levels in a liquid stream. In these applications, the resistive controller of this invention senses the electrical resistance which is indicative of a characteristic of the substance being monitored, such as a low moisture level in the soil or a low chlorine level in a swimming pool, and, when the resistance is not within the prescribed level, the resistive controller actuates an external electrical device which operates an apparatus for adding additional quantities of a second substance, such as water or chlorine, to the first medium to place the measured characteristic of the first substance within the predetermined limits, as evidenced by the electrical resistance being measured.

Referring now to the drawing, to FIG. 1 in particular, there is shown a schematic diagram of the circuitry of the resistive controller of this invention. The circuitry includes a source 10 of electrical power which, in the embodiment illustrated, provides 24 volts of alternating current power to the resistive controller. It will be noted that 115 volts AC may also be utilized, in which case a transformer would be required to transform the 115 volts AC to a lower voltage level for use with the resistive controller circuitry. Associated with the source 10 of electrical power are a power on switch 12, a fuse or circuit breaker 14, and a lamp 16 which provides an indication of power being applied to the circuitry. The source 10 of electrical power is input to a diode bridge rectifier 18 formed of diodes D1, D2, D3 and D4. The diode bridge 18 provides rectified power to the remainder of the circuitry. Connected to one of the arms of the diode bridge 18 is a voltage divider network formed of resistors R3, R4 and R5 connected in series between the diode bridge 18 and ground. The voltage divider network is utilized to provide appropriate biasing voltage levels to the sensor 20 and the first transistor T1, with the mid-point between resistors R3 and R4 being connected to the sensor 20 and the mid-point between resistors R4 and R5 connected to the base terminal of transistor T1.

The sensor 20 may be any suitable type of sensor for the particular medium or substance being monitored. Typically, the sensor 20 is formed of a pair of first and second probes, not shown, each of which is formed of insulated metal plates. The probes are disposed in spaced-apart relationship in the substance to be monitored and thereby provide or sense the electrical resistance of the substance between the respective probes. According to this invention, the probes are resistive-type probes having approximately 100 to 400 ohms internal resistance. In the embodiment shown in FIG. 1, the end of one of the probes is connected to the mid-point between resistors R3 and R4 with the end of the other probe connected to the collector terminal of transistor T1.

The resistive controller also includes an electrical resistance means, such as an adjustable potentiometer P1. The potentiometer P1 has one end of the adjustable arm connected to ground with the output end being connected to the collector terminal of transistor T1 along with one of the probes from the sensor means 20. The emitter terminal of transistor T1 is in turn connected to the base terminal of the second transistor means T2 which further includes suitable biasing network consisting of capacitor C2 and resistor R6 connected as shown in FIG. 1. The output from transistor T2 is connected to the gate of a silicon controlled rectifier SCR1 which has its cathode connected to ground and its anode connected to one end of a relay coil 22. The other end of the relay coil 22 is connected to one of the arms of the diode bridge 18 and is energized when the silicon controlled rectifier SCR1 is gated to a conducting state and forms a current flow path for the relay coil 22 to ground.

Associated with the relay coil 22 is a normally opened contact 24 which is connected between the source of electrical power 10 and an external load device, shown symbolically by reference number 26. When the relay coil 22 is energized, as described above, the contact 24 will close thereby connecting the load device 26 to the source of electrical power 10. In addition, a second lamp 28 is connected in parallel with the load device 26 to indicate when the load device 26 is connected to the source 10 of electrical power.

Thus, transistors T1 and T2, and silicon-controlled rectifier SCR1 form a first electrical switch means which is responsive to the resistance provided by the sensor means 20 and the electrical resistance means P1 and which is actuated when the resistance measured by the sensor means 20 reaches a predetermined level, said predetermined level being initially set by the electrical resistance means P1, which in the preferred embodiment is an adjustable potentiometer. Further, the electrical relay 22 is responsive to the actuation of the first electrical switch means for connecting an electrical load 26 to a source 10 of electrical power.

The resistive controller further includes a timer circuit which is activated upon the energization of the first relay 22 and is connected to the source 10 of electrical power upon the closing of the contact 24 associated with the first relay 22. The timer circuit is centered around a third transistor T3 which is of the unijunction type. The transistor T3 is suitably biased by resistors R10 and R11. The base terminal of the third transistor means T3 is connected to the mid-point of a RC network formed of a serially connected adjustable potentiometer P2 and a capacitor C3. The potentiometer P2 provides a means for varying the resistance of the RC network so as to change the time constant of the network and thereby determine the amount of time after energization of the relay 22 that the third transistor T3 is switched to a conducting state. The output of the transistor T3 is connected to the gate of a silicon controlled rectifier SCR2 and switches SCR2 into a conducting state when itself is energized. Zener diode Z1 is connected in parallel with the RC network to regulate the voltage to the unijunction transistor T3.

The silicon controlled rectifier SCR2 is serially connected between a second relay coil 27 and one of the arms of the diode bridge 18 and thereby provides a conducting path through the relay coil 27 when switched to a conducting state. Diode D6 and capacitor C4 are connected in parallel across the relay coil 27 to hold the relay coil 27 in an energized or on state after SCR2 has switched to a conducting state. In addition, lamp means 30 is connected in parallel with the relay 27 to provide an indication of the energization of the relay coil 27. Associated with the relay coil 27 is a normally closed contact 32 which is serially connected between the first contact 24 and the external electrical load 26. This contact 32 functions to disconnect the load 26 from the source of electrical power 10 after the expiration of the preselected time period as described below.

In operation, the sensor 20, which is disposed in the substance to be monitored, provides a measurement of the electrical resistance of the substance which is proportional to a characteristic to the substance, such as the moisture level. Initially, the potentiometer P1 is adjusted to provide a reference level resistance for the circuit. The potentiometer P1 and sensor 20 act as a voltage divider such that when the resistance measured by the sensor 20 decreases below a predetermined level, as set by the potentiometer P1, the transistor T1 will be gated to an "on" state. The output of transistor T1 is amplified by transistor T2 to an appropriate level to gate SCR1 to an "on" state and thereby energizing the relay coil 22. Upon energization of the relay 22, its associated contact 24 closes thereby connecting the external load 26 to the source 10 of electrical power. The load 26, which may be any suitable electrical device, such as a solenoid-operated valve, acts to add additional quantities of a second substance, such as water or chlorine, to the first substance to thereby balance the constituent levels of the first substance.

When the first relay 22 has been energized, power is applied through contact 24 to the timer circuit. Voltage will begin to build up at the base terminal of transistor T3 as determined by the time constant of the RC network formed of capacitor C3 and potentiometer P2. Potentiometer P2 can be adjusted to provide any predetermined time period up to approximately five minutes depending upon the valve of C3 before the second relay 27 is energized. The time constant of the RC network formed of capacitor C3 and potentiometer P2 determines the rate of charge build up at the base terminal of transistor T3. When sufficient charge has been built up at the base terminal thereon, transistor T3 will be switched to a conductive state. If the first relay 22 is still energized, thereby causing power to continually be applied to the timer circuit, the switching of transistor T3 to a conductive state will, in turn, cause SCR2 to be gated to an "on" or conducting state which causes the second relay 27 to be energized. The energization of the second relay 27 causes its associated normally closed contact 32 to open which will disconnect the load or external device 26 from the source 10 of electrical power. In this manner, the load 26 is automatically disconnected from the source 10 of electrical power when the constituent parts of the substance being monitored have not returned to balanced levels within a prescribed time period, as set by the timer circuit. If the first relay 22 is deenergized before transistor T3 has been switched to a conductive state, indicating that the system is balanced, the timer circuit will be disconnected from the source 10 of electrical power before the expiration of the predetermined time period.

The timer circuit included in the resistive controller of this invention provides additional protection of the control apparatus since the external device is automatically disconnected from the source of electrical power whenever the constituents of the substance being monitored, as evidenced by the electrical resistance sensor by the sensors 20, has not returned to a balanced condition within a prescribed period of time after the application of a second substance to the first has been initiated. Such a situation can occur whenever inadequate amounts of the second substance are available or a defect has occurred in the control apparatus applying the second substance to the first.

Figure 2:
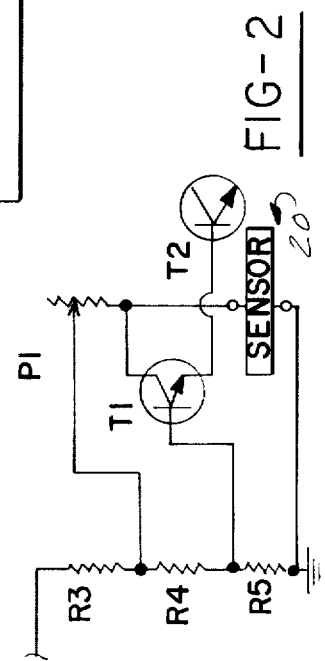
FIG. 2 is a schematic diagram of a portion of the resistive controller shown in FIG. 1 which is constructed according to another embodiment of this invention.

Referring now to FIG. 2, there is shown a portion of the control circuitry of the resistive controller of this invention constructed according to another embodiment of this invention. As described above, the embodiment illustrated in FIG. 1 is operative to be activated whenever the resistance measured by the sensor 20 falls below a predetermined value. In the embodiment shown in FIG. 2, the resistive controller is activated whenever the resistance measured by the sensor 20 exceeds a predetermined value. As shown in FIG. 2, the arm of the adjustable potentiometer P1 is connected to the mid-point between resistors R3 and R4, with the output of the potentiometer P1 connected to the collector terminal of the first transistor T1. One probe of the sensor 20 is connected to ground with the other probe connected along with the output of the potentiometer P1 to the collector terminal of the transistor T1. The sensor 20 and the potentiometer P1 again function as a voltage divider such that increasing resistance levels measured by the sensor 20 will cause, at a predetermined level set by potentiometer P1, transistor T1 to be switched to a conducting state, which, causes the first relay 22 to be energized and the external device 26 connected to a source of electrical power as described above. Through the use of the embodiment shown in FIG. 2, the resistive controller of this invention can be applied to those applications requiring activation upon increasing resistance levels, such as in soil moisture control systems.

Figure 3:
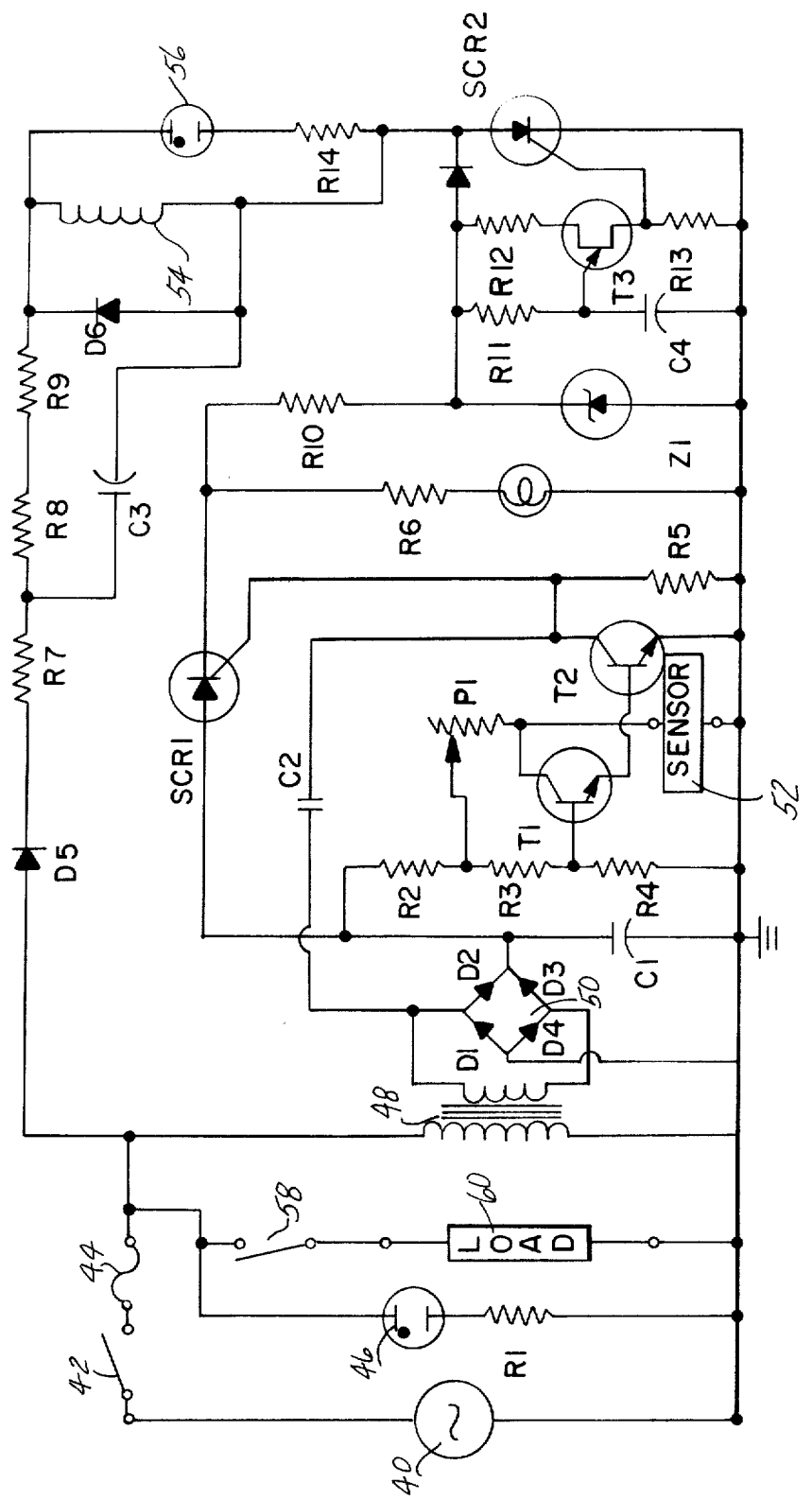
FIG. 3 is a schematic diagram of another embodiment of the resistive controller of this invention.

Referring now to FIG. 3, there is shown another embodiment of the resistive controller constructed according to the teachings of this invention. The resistive controller shown therein functions similarly to that described above but with the added feature of providing time delay upon actuation or when the resistance measured by the sensor reaches a predetermined level.

The resistive controller of this embodiment receives 115 volts of alternating current power from a suitable source 40. Although 115 volts A.C. power is depicted, other voltage magnitudes may also be used within the scope of this invention. The electrical power from the source 40 is fed to the remainder of the circuitry of the resistive controller through a power on switch 42 and a circuit breaker or fuse 44. A light 46 provides an indication of the presence of electrical power to the resistive controller. The power from the source 40 is fed to a transformer 48 in order to transform the voltage down to a magnitude suitable for the electronic circuitry used in the construction of the resistive controller. It should also be noted that the transformer 48 would also be utilized with the embodiment described above and shown in FIG. 1 when 115 volts alternating current is utilized as the source of electrical power.

The secondary of the transformer 48 is connected to a diode rectifier bridge 50 formed of diodes D1, D2, D3 and D4. One of the arms of the diode bridge 50 is connected to a voltage divider network formed of serially connected resistors R2, R3 and R4. The mid-point of the connection between resistors R2 and R3 is connected to an electrical resistance means, such as an adjustable potentiometer P1. In addition, a resistive sensor 52, identical to that described above, is connected between the potentiometer P1 and ground such that the resistive controller is actuated when the measured resistance increases past a predetermined level. The mid-point of the connection between the potentiometer P1 and sensor means 52 is connected to the collector terminal of a first transistor T1, which also has its base terminal connected to the mid-point of the connection between resistors R3 and R4. The output of transistor T1 is connected to the base of an amplifying transistor T2 which functions to amplify the output voltage of the first transistor T1. The collector terminal of T2 is connected to the gate input of SCR1 such that when sufficient voltage is present at the output of transistor T2, the SCR1 is gated to an "on" or conducting state and provides a current flow path for the remainder of the circuitry of the resistive controller.

It should also be pointed out that the sensor means 52 and potentiometer P1 illustrated in FIG. 3 are connected so as to actuate the resistive controller upon increasing resistance levels being measured. The circuit illustrated in FIG. 3 may also be modified in the manner described above with regard to FIG. 1 so as to actuate the resistive controller when the measured resistance decreases past a predetermined level.

When the SCR1 is gated to a conductive state, electrical current flows to a timer circuit consisting of a third transistor T3 and a resistive-capacitor network formed of serially connected resistor R11 and capacitor C4, which are connected to the base terminal of the transistor T3. The resistive-capacitive network provides an adjustable time delay after energization of the timer circuit in that the build up of electrical charge at the base terminal of the transistor T3 is determined by the time constant of the resistive-capacitive network. When sufficient charge is present at the base of the transistor T3, T3 is switched to a conductive state which, in turn, gates or switches SCR2 to a conductive state thereby connecting an electrical relay coil 54 to ground. Associated with the electrical relay 54 is a normally open contact 58 which is connected between the source of electrical power 40 and a suitable load device 60, such as an electrical solenoid. Upon energization of the relay coil 54, as described above, the normally open contact 58 closes thereby connecting the load 60 to the source of electrical power 40 and causing energization of the load device 60.

In operation, when the resistance measured by the sensor means 52 reaches a predetermined level, the timer circuit is actuated so as to initiate charge build up at the base of the transistor T3. After a predetermined amount of time, as set by the time constant of the resistive-capacitive network formed of resistor R11 and capacitor C4, transistor T3 is switched to a conductive state, which in turn, gates SCR2 to a conductive state thereby energizing the relay coil 54 and connecting the load 60 through the contact 58 to the source of electrical power 40.

In summary, there have been disclosed herein a new and improved resistive controller suitable for sensing a variable electrical resistance indicative of a characteristic of a first substance and for connecting an external electrical device to a source of electrical power to add additional amounts of another substance to the first substance whenever the measured electrical resistance reaches a predetermined level. The resistive controller uniquely includes a timer circuit which is activated whenever the measured electrical resistance reaches the predetermined level and which, in embodiment, provides an adjustable time period, upon the expiration of which, the electrical device is disconnected from the power source. In another embodiment, the timer circuit connects the electrical device to the power source a predetermined amount of time after the measured resistance reaches the preselected level. Furthermore, the resistive controller of this invention may be applied to those applications requiring activation whenever the measured resistance exceeds a predetermined level as well as those applications wherein the measured electrical resistance is decreasing and activation of the control system is required whenever the measured electrical resistance drops below a predetermined level.

What is claimed is:

1. A resistive controller adapted to be connected to a source of electrical power for sensing a variable electrical resistance indicative of a selected characteristic of a first substance, said resistive controller comprising:

sensor means, adapted to be disposed in said substance to be monitored, for sensing a variable electrical resistance indicative of said selected characteristic of said substance;

first electrical switch means;

means, operable in conjunction with said sensor means, for actuating said first electrical switch means when the resistance sensed by said sensor means reaches a predetermined level, said predetermined level of resistance being set by said actuating means;

means, responsive to the actuation of said first electrical switch means, for connection an external load to said source of electrical power, said external load being operative to control the addition of a second substance to said first substance;

timer means, responsive to said connecting means, for providing an adjustable time period after said external load is connected to said source of electrical power; and means, responsive to said timer means and said sensor means, for permanently disconnecting said external load from said source of electrical power after the expiration of said time period if said variable electrical resistance measured by said sensor means has not returned to a predetermined range of values within said time period.

2. The resistive controller of claim 1 wherein the means for actuating the first electrical switch means includes an electrical resistance means for providing a predetermined electrical resistance.

3. The resistive controller of claim 2 wherein the electrical resistance means is variable within a predetermined range of electrical resistances so as to allow the predetermined level of resistance to be adjustably set over a predetermined range of values.

4. The resistive controller of claim 2 wherein the first electrical switch means includes a first transistor and wherein the sensor means includes first and second resistive probes disposed in spaced-apart relationship in the substance to be monitored, said first and second probes being connected in series with the electrical resistance means between the source of electrical power and ground, with the mid-point between said sensor means and said electrical resistance means being connected to the first transistor such that changes in the electrical resistance sensed by the said sensor means cause said first transistor to switch to a conductive state when said measured resistance reaches the predetermined level.

5. The resistive controller of claim 4 wherein:
one end of the electrical resistance means is connected to ground and the other end is connected to the end of one of the first and second probes of the sensor means; and
the end of the other of said first and second probes of said sensor means is connected to the source of electrical power such that the first transistor will be switched to a conducting state whenever the resistance sensed by the sensor means decreases past the predetermined level.

6. The resistive controller of claim 4 wherein:
the end of one of the first and second probes of the sensor means is connected to ground and the end of the other one of said first and second probes of said sensor means is connected to one end of the electrical resistance means; and
the other end of said electrical resistance means is connected to the source of electrical power such that changes in the electrical resistance sensed by said sensor means cause the first transistor to switch to a conducting state when the resistance sensed by said sensor means increases past the predetermined level.

7. The resistive controller of claim 1 wherein the means for connecting an external load includes an electrical relay, said electrical relay being actuated by the first electrical switch means, said electrical relay further having a first normally opened contact which closes upon the actuation of said relay and connects said external load to the source of electrical power.

8. The resistive controller of claim 1 wherein the timer means includes:
a transistor;
a resistive-capacitive network;
said resistive-capacitive network being connected to the base of said transistor and comprising a capacitor and an adjustable resistance means connected in series, said adjustable resistance means enabling the time constant of said resistor-capacitor network to be varied within a predetermined range such that a predetermined amount of time after power is applied to said resistive-capacitive network, said transistor will be switched to a conductive state.

9. A resistive controller adapted to be connected to a source of electrical power for sensing a variable electrical resistance indicative of a selected characteristic of a substance, said resistive controller comprising:
sensor means, disposed in said substance, for sensing a variable electrical resistance indicative of said selected characteristic of said substance;
first electrical switch means;
means, responsive to said sensor means, for actuating said first electrical switch means when the resistance measured by said sensor means reaches a predetermined level, said predetermined level of resistance being set by said actuating means;
timer means, responsive to said first electrical switch means, for providing an adjustable time period after the actuation of said first electrical switch means, and
means, responsive to said timer means, for connecting an electrical load to said source of electrical power after the expiration of said time period.

10. The resistive controller of claim 9 wherein the means for actuating the first electrical switch means includes an electrical resistance means, said electrical resistance means having a predetermined magnitude so as to establish the predetermined level of resistance upon which said first electrical switch means is actuated.

11. The resistive controller of claim 10 wherein the first electrical switch means includes a first transistor and wherein the sensor means includes first and second resistive probes disposed in spaced-apart relationship in the substance to be monitored, said first and second probes being connected in series with the electrical resistance means between the source of electrical power and ground, with the mid-point between said sensor means and said electrical resistance means being connected to the first transistor such that changes in the electrical resistance sensed by the said sensor means cause said first transistor to switch to a conductive state when said measured resistance reaches the predetermined level.

12. The resistive controller of claim 11 wherein:
one end of the electrical resistance means is connected to ground and the other end is connected to the end of one of the first and second probes of the sensor means; and
the end of the other of said first and second probes of said sensor means is connected to the source of electrical power such that the first transistor will be switched to a conducting state whenever the resistance sensed by the sensor means decreases past the predetermined level.

13. The resistive controller of claim 11 wherein:
the end of one of the first and second probes of the sensor means is connected to ground and the end of the other one of said first and second probes of said sensor means is connected to one end of the electrical resistance means; and
the other end of said electrical resistance means is connected to the source of electrical power such that changes in the electrical resistance sensed by said sensor means cause the first transistor to switch to a conducting state when the resistance sensed by said sensor means increases past the predetermined level.

14. The resistive controller of claim 9 wherein the means for connecting the electrical device to the source of electrical power includes an electrical relay, said electrical relay further having a first normally opened contact connected between said source of electrical power and the electrical load, said first contact closing upon the energization of said electrical relay so as to connect said electrical load to said source of electrical power.

* * * * *